United States Patent Office 3,483,022
Patented Dec. 9, 1969

3,483,022
THERMOSEALABLE COATING COMPOSITION CONTAINING AN ORGANIC ACID TREATED VEGETABLE OIL
Pierre Hullot, Limay, Yvelines, France, assignor to Cellophane Investment Co., Ltd., Alderney, Channel Islands, a corporation of Great Britain
No Drawing. Filed May 19, 1966, Ser. No. 551,205
Claims priority, application France, June 18, 1965, 21,314
Int. Cl. C09j 7/00; C08d 13/24; B44d 1/22
U.S. Cl. 117—122                               8 Claims

ABSTRACT OF THE DISCLOSURE

An improved process for producing a thermosealable plastic film by the application of a thermosealable varnish coating wherein the tendency of the varnish to gum is substantially eliminated by including within such varnish coating an effective amount of an organic acid treated vegetable oil.

---

The present invention is directed to a process and composition for the production of coated thermosealable plastic films, and more particularly, to such films made non-gumming during sealing by the addition of an acid treated vegetable oil.

It has long been known to coat synthetic material, e.g. cellulose films, with a varnish capable of improving such properties as impermeability, brilliance and especially, thermosealability. Such varnishes include, for example, those with a base of nitrocellulose or polymers of vinyl chloride, vinylidene chloride and various copolymers of these materials, etc.

In the past, when lower speed thermosealing operations and higher temperatures were employed, there was little problem of gumming of the sealing iron in the sealing process. Such low speed-high temperature processes, however, were found uneconomical and have given way to processes with increasingly higher speeds. Thus, with increasing speed of the sealing operation, it has become necessary to constantly increase the rapidity of sealing of the varnishes employed for this purpose.

Since the contact time during sealing is shorter, this increase in speed is accompanied, for the same temperature of the irons, by a lowering of the temperature at which the coating is effectively made during this operation. As a result, these devices work at a temperature closer to the lower limit of the temperature at which sealing can take place and often dangerously close to it.

Thus, frequently the sealing irons are gummed up by being gradually covered with a coating deposit. Since this deposit acts as a thermal insulator, the temperature at which the coating is effectively carried out is reduced still more, and it rapidly falls below the sealing temperature limit. It is therefore essential to clean the irons frequently. This drawback, which was not present when sealing machines with a high sealing temperature, strong pressure and slow rate were used, has become common with the use of ultra-rapid machines and is quite troublesome since it directly wipes out the increased output sought by their use.

Various attempts have been made to remedy this defect by specially treating the sealing organs to prevent the coating from sticking to them. For example, anode oxidation treatments and silicone base treatments have been attempted but these processes require the use of special metals, which are generally costly, and their effectiveness has been found insufficient.

It has long been the desire, therefore, of the coating industry to produce an inexpensive sealing composition which will not tend to gum up the sealing iron employed in high speed thermosealing apparatus.

It has now been found that a suitable sealing composition which eliminates the tendency to gum in thermosealing operations is produced by incorporating into a conventional sealing varnish a small amount of an organic acid treated vegetable oil.

It is therefore a principal object of the present invention to provide a process for sealing and sealing composition which ih free from the inherent drawbacks of previously employed processes and materials.

It is still a further object of the present invention to propide a process for sealing and seal composition which substantially eliminates the tendency to gum when employed in high speed thermosealing apparatus.

It is yet a further object of the present invention to provide such a process and composition wherein a small amount of an acid-treated vegetable oil is incorporated in a conventional sealing varnish.

Still further objects and advantages of the present invention will become more apparent from the following more detailed description of the invention.

The synthetic materials that can be sealed by the process and composition of the present invention include all those conventionally made heat sealable by the application of varnish coatings. These include, as non-limitative examples, films of regenerated cellulose (rayon and cellophane) films of cellulose acetate, polyester films, polyethylene, cellulose ether films, polypropylene, polyvinyl chloride, polyvinylidene chloride, polyvinyl acetate, polyvinylpyrrolidone, polyurethanes (polyether and polyester based), polyamides, natural and synthetic rubbers and derivatives, and various other synthetic materials as well as various copolymers of the exemplary materials above. Of these, the present invention has found particular utility in the heat sealing of cellulose films and regenerated cellulose films in particular.

In practicing the process of the present invention, a small amount of an acid treated vegetable oil is incorporated in a conventional thermosealing varnish which is applied to the synthetic films in order to allow the film to be sealed by heating in the standard manner. These conventional varnishes include, for example, varnishes having a nitrocellulose base, those having a polymerized vinyl chloride base, those having a polymerized vinylidene chloride base, mixtures of these latter two and those having as a base a composition comprising various copolymers of vinyl chloride and/or vinylidene chloride with materials such as vinyl acetate, acrylonitrile, methyl methacrylate, styrene, etc. Of course, these varnishes are merely exemplary of those suitable for the process of the present invention as any conventional thermosealing varnish can be suitably employed.

All sufficiently pure vegetable oils can be utilized in the composition and process of the present invention. Thus, for example, exemplary materials include linseed oil, castor oil, cottonseed oil, olive oil, corn oil, palm oil, peanut oil, soybean oil, etc. Their effectiveness, however, varies somewhat according to the nature of the oil used, and thus linseed oil and castor oil, having been found to yield the best results, are preferred.

The improvement in the substantial elimination of gumming to where it is only negligible or non-existent is greater as the amount of oil added to the coating varnish increases. However, this amount should not be such as to reduce appreciably the sealing capacity of the varnish or cause an exaggerated plastification of the coating deposited on the film. For these reasons, the acid-treated vegetable oil is generally employed in an amount of from 0.01% to about 5.0% by weight of the coating and preferably from about 2.0% to about 4.0%.

It is essential that the vegetable oil used in the composition and process of the present invention be previously treated with an acid, preferably an organic acid. Suitable acid treating agents include, for example, acetic, propionic and butyric acids; various hydroxy acids such as glycolic, malic, tartaric ricinoleic and citric; aromatic acids such as benzoic; polycarboxylic acids such as sebacic, succinic, etc., and various other organic acids. Of these, the hydroxyl-containing and particularly citric acid, are preferred.

It has been found that to obtain an effective elimination of the gumming of the sealing irons the acid index of the treated vegetable oil incorporated in the coating should be controlled. However, a direct relation has not been found between the acid index and the reduction of gumming, the latter, on the contrary, increasing when this index becomes too high. This acid index, however, should be between that of the natural oil and that which corresponds to the complete transformation of esters into fatty acids. It is preferably close to the mean of both indices which differs according to the oil employed.

The following examples illustrate various embodiments of the present invention:

To determine the gumming effect of the coatings, the following procedure was used:

With a brass sealing shoe having a surface of 38 x 28 mm. brought to 120° C., twenty sealings are made on the support bands covered by a thermosealable coating. The surface of the sealing irons, which has been gummed, was then measured. The value of the index was measured by the percentage of the gummed surface in relation to the total surface of the iron, an index of 100 corresponding to gumming of the total surface of the shoe.

EXAMPLE I

A cellulose film weighing about 20–40 gr. per square meter containing about 15% by eight of glycerin, was coated, by ordinary means, on both its faces with a layer weighing about 1.5 gr. per square meter for each face, or about 3 gr. per square meter for both faces, of a coating of the following composition based on 100 gr. of solid materials dissolve in 400 grams of ethyl acetate and 300 grams of toluene:

| | Grams |
|---|---|
| Low viscosity nitrocellulose | 45 |
| Paraffin, melting point—61° C. | 2 |
| Dibutylphthalate | 20 |
| Dicyclohexylphthalate | 20 |
| Monoacid ester of monoethylene glycol with a terpenomaleic acid, polymerized | 8 |
| Partially polymerized resin (polypale) | 3 |
| Maleic acid | 1.3 |
| Bentonite | 0.5 |
| | 100 |

The cellulose film had been impregnated during its fabrication with a urea-formol anchorage resin so that it contained between 0.05% and 1% of this resin.

The coated film duly dried and subject to the sealing test defined above, gummed the entire surface of the iron. It, therefore, had a gumming index of 100.

When there was incorporated in this coating, 3% castor oil heated for 1 hour and 30 minutes at a temperature of 160° C. with citric acid in the proportion of 15% citric acid for 85% castor oil, the castor oil thus treated having an acid index of 71, the gumming index of a film coated under the same conditions as the preceding with this latter varnish was brought substantially to zero without its thermosealing properties being modified.

EXAMPLE II

On a film identical with the preceding, there was applied a coating of the same composition as in Example I in which was incorporated 3% linseed oil heated for 1 hour and 30 minutes at 180° C. with the same proportion of citric acid. The acid index of the linseed oil was brought to 43 by this treatment.

Tests similar to those above showed a gumming index between 5 and 10 instead of 100 for the film coated with a varnish not having the preparation with a linseed oil base.

EXAMPLE III

A regenerated cellulose film similar to those in Examples I and II was coated with a varnish with the following composition:

| | Grams |
|---|---|
| Copolymer of vinyl chloride and vinyl acetate in a proportion of 87% chloride for 13% acetate | 100 |
| Paraffin | 3 | in solution in 600 gr. of methyl ethyl ketone, a solution to which has been added 0.2 gr. of fine grain silica (Aerosil O).

The index of gumming of the sealing shoes measured under the above conditions was 80.

When 2% castor oil treated with citric acid under the conditions indicated in Example I was incorporated in the above coating, the gumming index measured under the conditions described was brought to 15. The acid index of the treated oil was 71.

EXAMPLE IV

A regenerated cellulose film similar to that of Examples I, II and III was coated with a varinsh with the following composition:

| | Grams |
|---|---|
| Copolymer of vinylidene chloride and acrylonitrile | 100 |
| Dilauric ketone | 0.5 | in solution in 600 gr. of tetrahydrofurane, a solution to which has been added 0.2 gr. of fine grain silica.

The index of gumming of the sealing shoes of a film thus coated was 40.

When 3% castor oil treated with citric acid under the conditions indicated in Example I was added, the gummining index measured under the same conditions was brought to 5. The acid index of the treated oil was 71.

EXAMPLE V

A polyethylene terephthalate film weighing about 25–45 grams per square meter was coated with nitrocellulose based varnish as in Example I.

When the coated film was dried and subjected to the sealing test defined above, the entire surface of the iron gummed. It, therefore, had a gumming index of 100.

When the film was coated with the same varnish in which 3% natural cottonseed oil had been incorporated, only slight improvement was found. However, when, instead of 3% natural cottonseed oil, cottonseed oil treated at approximately 160° with 20% ricinoleic acid was employed, the gumming index of the film under the same conditions was substantially zero.

When instead of ricinoleic acid, the cottonseed oil was treated with 20% sebacic acid, a similar improvement was seen. Here, the gumming index was about 15, as measured under the conditions described above.

EXAMPLE VI

Example V was repeated using the vinyl chloride-vinyl acetate varnish of Example III. Here, the ricinoleic acid treated cottonseed oil when incorporated in the above varnish, produced a gumming index of approximately 5–10.

When, in lieu of cottonseed oil, soybean oil was treated with 20% ricinoleic acid as in Example V and incorporated in the above varnish, a similar result was observed. Here, the gumming index was found to be approximately 0–5, as measured in the above-described test.

While various preferred embodiments of the present invention have been described by way of specific example, it is to be understood that the invention is in no way to be limited thereto but should be construed as broadly as all or any equivalents thereof.

I claim:

1. In a process for producing a thermosealable plastic film by the application of a thermosealable varnish coating comprising a base selected from nitrocellulose and polymers and copolymers of vinyl chloride, vinylidene chloride and mixtures thereof to a synthetic plastic film, the improvement which comprises incorporating in said varnish base, in an amount effective to substantially eliminate the tendency of said varnish to gum, from 0.01% to about 5.0% by weight of the coating of an organic acid treated vegetable oil selected from the group consisting of linseed oil, castor oil, cottonseed oil, olive oil, corn oil, palm oil, peanut oil, and soybean oil, said organic acid treated vegetable oil being obtained by heating said oil with an organic acid selected from the group consisting of saturated lower aliphatic monocarboxylic acids and hydroxy-containing aliphatic carboxylic acids containing from 1 to 3 carboxyl groups, so as to produce an organic acid treated vegetable oil having an acid index of between that of the natural oil and that which corresponds to the complete transformation of esters into fatty acids.

2. The process of claim 1 wherein the vegetable oil is linseed oil.

3. The process of claim 1 wherein the vegetable oil is castor oil.

4. The process of claim 1 wherein the organic acid is an hydroxyl-containing aliphatic carboxylic acid containing from 1-3 carboxyl groups.

5. The process of claim 4 wherein the acid is citric acid.

6. The process of claim 4 wherein the acid is ricinoleic acid.

7. The process of claim 1 wherein the thermosealable varnishing coating has a nitrocellulose base.

8. The process of claim 1 wherein the thermosealable varnish coating has a base selected from polymers and copolymers of vinyl chloride, vinylidene chloride and mixtures thereof.

References Cited

UNITED STATES PATENTS

| 1,927,296 | 9/1933 | Powers | 106—171 |
| 2,015,145 | 9/1935 | Hubbuch | 106—171 |
| 2,027,466 | 1/1936 | Brubaker | 106—171 |
| 2,502,606 | 4/1950 | Ullmann | 106—171 |

OTHER REFERENCES

Hercules Powder Company, "High Solids Nitrocellulose Lacquers," Form 500–30A 3M, 11–45 (1945), p. 27.

ALLAN LIEBERMAN, Primary Examiner

U.S. Cl. X.R.

106—171; 117—138.8; 260—23